United States Patent [19]

Espedal et al.

[11] Patent Number: 4,754,913
[45] Date of Patent: Jul. 5, 1988

[54] METHOD OF JOINING ZINC COATED ALUMINUM MEMBERS AND UNCOATED ALUMINUM MEMBERS

[75] Inventors: Arvid B. Espedal, Haugesund, Norway; Richard Knoll, Cocoa Beach, Fla.

[73] Assignee: Norsk Hydro a.s., Oslo, Norway

[21] Appl. No.: 879,584

[22] Filed: Jun. 27, 1986

[51] Int. Cl.$^4$ ................................................. B23K 1/06
[52] U.S. Cl. ...................................... 228/183; 228/262
[58] Field of Search ...................... 228/110 F, 262, 183

[56] References Cited

U.S. PATENT DOCUMENTS

| | | | |
|---|---|---|---|
| 1,917,042 | 7/1933 | Lewis et al. | 228/183 |
| 2,081,303 | 5/1937 | Karmazin | 228/183 |
| 2,105,405 | 1/1938 | Chase | 228/183 |
| 2,423,697 | 7/1947 | Garfield | 228/183 |
| 2,996,600 | 8/1961 | Gardner, Jr. et al. | 228/183 |
| 3,063,145 | 11/1962 | Bouton | 228/263.17 |
| 3,680,200 | 8/1972 | Terrill et al. | 228/262 X |
| 3,710,473 | 1/1973 | McElwain et al. | 228/183 |
| 3,991,933 | 11/1976 | Antonevich | 228/262 X |
| 4,615,952 | 10/1986 | Knoll | 228/183 X |

FOREIGN PATENT DOCUMENTS

| | | | |
|---|---|---|---|
| 52-259 | 4/1977 | Japan | 228/183 |
| 21654 | 2/1979 | Japan | 165/133 |
| 36431 | 9/1980 | Japan | 228/110 F |
| 64472 | 4/1982 | Japan | 228/183 |
| 154456 | 9/1983 | Japan | 228/183 |
| 604193 | 6/1948 | United Kingdom . | |

OTHER PUBLICATIONS

Welding Journal, Jan. 1976, "Fluxless Soldering of Aluminum Heat Exchangers", by W. B. Jenkins, pp. 28–35.

Primary Examiner—Kenneth J. Ramsey
Attorney, Agent, or Firm—Wenderoth, Lind & Ponack

[57] ABSTRACT

Fluxless joining of aluminum members, one of which is provided wih a coating of zinc solder, includes preheating the assembled members to a temperature above the melting point of the solder coating and applying a multistep vibration to the assembled members at elevated temperature. A heat exchanging section has a core of spaced hollow aluminum shapes interconnected by thin aluminum fins extending through the zinc coating layer and having direct contact with the aluminum shapes.

6 Claims, 2 Drawing Sheets

METHOD OF JOINING ZINC COATED ALUMINUM MEMBERS AND UNCOATED ALUMINUM MEMBERS

BACKGROUND OF THE INVENTION

The invention concerns fluxless soldering of Al-members, more particularly joining of two or more Al-members where at least one of the members is provided with an adherent layer of zinc, and joined sections provided by such joining/soldering method.

Problems connected with soldering of Al-members using zinc as a solder due to the formation of a tenacious surface oxide layer on the Al-members are widely recognized and described by prior art, e.g. GB No. 1,519,891 and in co-pending U.S. patent appliction Ser. No. 848,113 filed Apr. 4, 1986.

Aluminum members coated in the nascent state by zinc or zinc alloys exhibit an excellent adhesion between the coating layer and the aluminum substrate due to the absence of an interfering oxide layer on the substrate surface during the coating process. In accordance with the present invention an improved, strong, consistent bond is achieved between the joined members by applying a multistep vibration to the joined members at elevated temperatures where at least one of the members was provided with an adherent bonded solder layer.

OBJECT OF THE INVENTION

The object of the present invention is to provide an improved method of fluxless soldering of aluminum members resulting in a strong consistent bond between the joined members.

Another object of the invention is to provide a rigid heat exchanging core having improved joint strength and heat transfer performance.

DESCRIPTION OF THE PREFERRED EMBODIMENT

The disclosed method of joining aluminum members is especially adapted for commercial production of aluminum heat exchanging sections, e.g. cores in radiators, comprising a plurality of spaced hollow Al-shapes precoated with zinc and interconnected by thin Al-plates, i.e. uncoated so-called finstock.

An extensive test program has been conducted on joining of zinc-coated Al-members to provide heat exchanging sections in order to find
(a) optimal process parameters
(b) optimal performance of the final product with regard to strength, rigidity, heat rejection etc.

The tested variables were soldering temperature, holding time, source of mechanical agitation, vibration frenquency exposure time, composition of the zinc/solder and thickness of the coating layer.

The tests were conducted in a small furnace on samples comprising flat oval Al-tubes precoated with zinc and plain (uncoated) thin aluminum finstock. In the course of these tests it has been found that a substantial increase in tensile strength (joints between tubes and finstock) can be achieved by several successive vibrations with a short holding time between the vibration steps.

EXAMPLE 1

Figure 1:
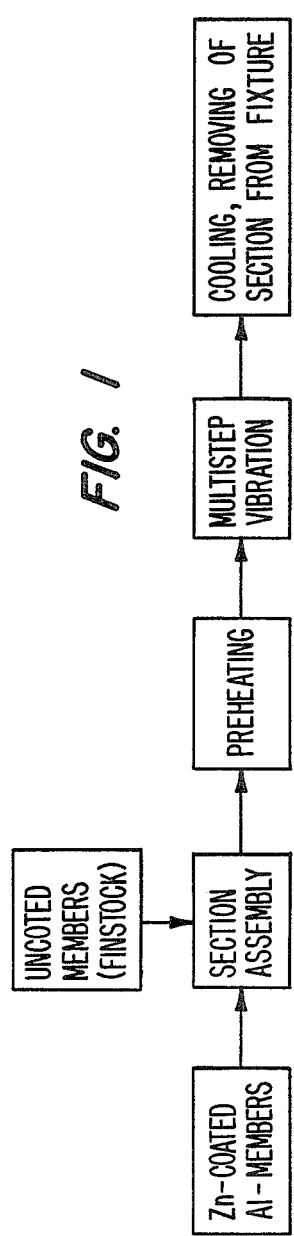
FIG. 1 is a flow chart schematically illustrating the successive steps in the method of joining aluminum members according to the present invention.
Figure 2:
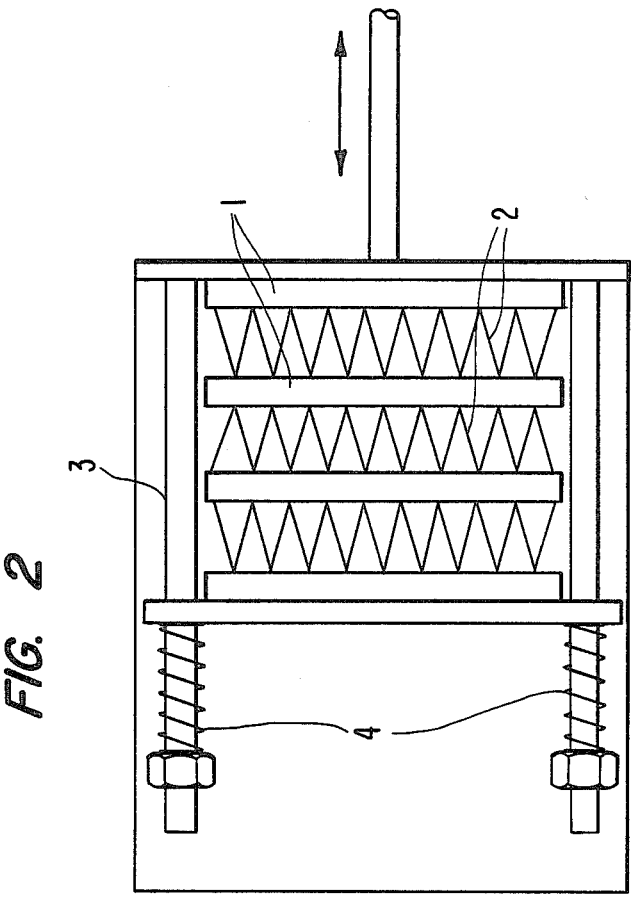
FIG. 2 is a schematic view showing the principle of joining Al-members by means of vibration applied to the assembled parts in a fixture.

The samples comprising Al-coated tubes (1) and finstock (2) arranged in a zig-zag pattern between the tubes were put into a spring loaded frame or fixture (3)—FIG. 2. The whole assembly was then inserted into a furnace (not shown) and heated to 400°-500° C. prior to exposure to a single vibration operation or cycle (vibration source not shown in the Figure).

The vibration frequently was varied between 50 to 80 Hz, amplitude from 1.3 to 2.2 mm, vibration exposure time from 1 to 7 sec.

Following tests on joint strength gave a tensile strength in average from 150 to 450N (some samples up to 1000N) without any significant relation to applied frequency but related to the surface condition of the coating layer (roughness) and applied temperature. The best results were achieved with a smooth uniform coating layer and by a high soldering temperature (over 440° C.).

EXAMPLE 2

New tests were conducted, this time with several successive discrete periods of vibration or vibration steps, in an identical arrangement as in Example 1.

Typical test parameters:
Vibration frequency: 60 Hz
Temperature: 400°-500° C.
Holding time between steps or periods of vibrations: 1 min.
Vibration time per step or period: 5 sec.
Number of steps or periods of vibrations: 1-7

The tensile strength in the joints resulting from these tests increased from 1100N (1 vibration) to 2000-2500N after 4-6 vibration steps, normally reaching a peak after the 4th-5th cycle, which seems to be the optimal number of vibration steps.

The optimal soldering temperature for the joining process according to the present invention is 400°-460° C. (function of solder composition/melting point for pure zinc 420° C., eutecticum ZnAl 382° C.).

There are obviously two reasons for this substantial increase in the joint's tensile strength and proven better heat transfer performance of the radiator cores provided in accordance with the disclosed joining method:

(a) During a simple vibration step there is no possibility to remove completely the oxide layer formed on the finstock. In order to crack and remove oxides several subsequent steps or periods of vibrations with a certain holding time between the steps or periods of vibrations, in order to allow for a diffusion of zinc from the coating layer to the finstock, are required.

(b) The macrostructure of the joints shows clearly that a direct contact between the aluminum in the finstock and the aluminum substrate of the tubes beneath the zinc layer is achieved.

Several other parameters can also influence the quality of the achieved joints between the Al-members. Besides already mentioned uniform quality and smoothness of coating there is, e.g., also an optimal coating thickness, shape/configuration of the applied finstock material and compostion of the zinc solder, all these parameters falling outside of the scope of the claimed invention.

We claim:

1. A method of joining first aluminum members coated with an adherent layer of solidified zinc solder to second uncoated aluminum members, said method comprising:

bringing said first and second aluminum members into contact with each other in a desired configuration in a spring-loaded fixture;

preheating the thus formed assembly of said first and second aluminum members to result in situ formation of molten zinc solder on the surfaces of said first aluminum members;

at elevated temperature, subjecting said assembly of first and second aluminum members to a plurality of discrete periods of vibration separated by holding periods of no vibration, and thereby achieving direct contact between said second aluminum members and the surfaces of said first aluminum members beneath said zinc solder; and cooling said assembly, to thereby solidify said zinc solder and thereby forming a joined assembly.

2. A method as claimed in claim 1, wherein said first aluminum members comprise hollow heat exchanger tubes, said second aluminum members comprise finstock, and said joined assembly comprises a heat exchanger core.

3. A method as claimed in claim 1, wherein said elevated temperature is from 380° to 500° C., and said plurality of discrete vibration periods comprise from two to six separate vibration periods.

4. A method as claimed in claim 3, wherein said elevated temperature is from 400° to 460° C., and said plurality of discrete vibration periods comprise from four to five separate vibration periods.

5. A method as claimed in claim 1, wherein said periods of vibration are conducted at a frequency of from 50 to 80 HZ.

6. A method as claimed in claim 5, wherein said frequency is from 60 to 70 HZ.

* * * * *